US007007545B1

(12) United States Patent
Martinek

(10) Patent No.: US 7,007,545 B1
(45) Date of Patent: Mar. 7, 2006

(54) METHOD AND MEASUREMENT PROBE FOR THE PERFORMANCE OF MEASUREMENTS IN WATER SUPPLY SYSTEMS

(76) Inventor: Peter Martinek, Rheinfähre 27, Hohenems (AT) A-6845

( * ) Notice: Subject to any disclaimer, the term of this patent is extended or adjusted under 35 U.S.C. 154(b) by 0 days.

(21) Appl. No.: 11/229,958

(22) Filed: Sep. 19, 2005

Related U.S. Application Data

(63) Continuation-in-part of application No. 10/452,174, filed on Jun. 2, 2003, now abandoned, which is a continuation of application No. 10/111,212, filed as application No. PCT/EP99/08076 on Oct. 26, 1999, now abandoned.

(51) Int. Cl.
*G01M 3/26* (2006.01)
*G01M 3/28* (2006.01)

(52) U.S. Cl. .............................. 73/40.5 A; 73/40.5 R; 73/49.1; 73/49.5; 73/49.8

(58) Field of Classification Search .................... 73/40, 73/40.5 A, 40.5 R, 45.5, 49.1, 49.5, 49.8
See application file for complete search history.

(56) References Cited

U.S. PATENT DOCUMENTS

| | | | |
|---|---|---|---|
| 1,881,543 | A | 10/1932 | Hartig et al. |
| 2,008,934 | A | 7/1935 | Smith |
| 3,261,200 | A | 7/1966 | Long |
| 3,695,094 | A | 10/1972 | Hulme |
| 3,838,593 | A | 10/1974 | Thompson |
| 4,066,095 | A | 1/1978 | Massa |
| 4,322,982 | A | 4/1982 | M üller et al. |
| 4,361,030 | A | 11/1982 | Heide |
| 4,457,163 | A | 7/1984 | Jackle |
| 4,543,817 | A | 10/1985 | Sugiyama |
| 4,640,121 | A | 2/1987 | Leuker et al. |
| 4,905,522 | A | 3/1990 | Schlatter et al. |
| 5,272,646 | A | 12/1993 | Farmer |
| 5,333,501 | A | 8/1994 | Okada et al. |
| 5,361,636 | A | 11/1994 | Farstad et al. |
| 5,448,921 | A | 9/1995 | Cage et al. |
| 5,531,099 | A | 7/1996 | Russo |
| 5,548,530 | A | 8/1996 | Baumoel |

(Continued)

FOREIGN PATENT DOCUMENTS

| | | |
|---|---|---|
| DE | 2804131 | 1/1978 |

(Continued)

OTHER PUBLICATIONS

Herbert Schaffhausen and Lutz Heger, "Leckerkennung und Ortung von Verlusten beim Betrieb von Mineralöl-Fernleitungen", TÜ 11 (1970) Nr. 6 Juni, pp. 213-215.

(Continued)

*Primary Examiner*—Hezron Williams
*Assistant Examiner*—David A. Rogers
(74) *Attorney, Agent, or Firm*—Volpe and Koenig, P.C.

(57) ABSTRACT

Measuring elements for the output of measured quantities in respect of the flow, namely the flow quantity and direction, the water pressure and the flow noise are integrated in a measurement probe (1) for water supply networks (13), whereby all these measuring elements are connected or can be connected to a data collector (12) by means of transmission by radio, modem or cable connection. The measurement probes are installed permanently at the key points (10) and at the most varied measurement points (11) following one another as closely as possible in the water supply network (13) and can thus contribute, by delivering all the necessary data, to the rapid tracing of leaks with pinpoint accuracy as well as to constant monitoring.

10 Claims, 2 Drawing Sheets

U.S. PATENT DOCUMENTS

| | | | |
|---|---|---|---|
| 5,602,327 | A | 2/1997 | Torizuka et al. |
| 5,708,195 | A | 1/1998 | Kurisu et al. |
| 6,647,762 | B1 | 11/2003 | Roy |

FOREIGN PATENT DOCUMENTS

| | | |
|---|---|---|
| DE | 2905070 | 2/1979 |
| DE | 3347190 | 12/1983 |
| DE | 3401488 | 1/1984 |
| DE | 3543169 | 11/1987 |
| DE | 4128750 | 8/1991 |
| DE | 19819258 | 4/1998 |
| EP | 0009263 | 9/1979 |
| EP | 0534003 | 7/1991 |
| EP | 0652420 | 5/1994 |
| EP | 19528287 | 2/1995 |

OTHER PUBLICATIONS

M. Kreiss, "Zur Simulation von Leckagen für die Überprüfung von Leckerkennungsanlagen" ("Simulation of leaks for checking leak detection systems") *3R International,* 15. Jahrgang, Heft 7, Jul. 1976, pp. 375-381.

Ing O. Mayer, "Überwachung von Wasserrohmetzen", *Neue DELIWA-Zeitschrift,* Heft Feb. 1982, pp. 71-72.

"Durchfluss- und Temperaturüberwachung mit Sensoren", M&P, Jun. 1992, pp. 6-8.

"Strömungswächter steuern die Trinkwasserversorgung für 3,6 Millionen Einwohner", *Wasser, Luft und Boden,* Jan./Feb. 1998, pp. 49-50.

METHOD AND MEASUREMENT PROBE FOR THE PERFORMANCE OF MEASUREMENTS IN WATER SUPPLY SYSTEMS

CROSS REFERENCE TO RELATED APPLICATIONS

This application is a continuation-in-part of U.S. patent application Ser. No. 10/452,174, filed Jun. 2, 2003 now ABN, which is a continuation of U.S. patent application Ser. No. 10/111,212, filed Apr. 22, 2002 now ABN, which is a Section 371 National Phase of PCT/EP99/08076, filed Oct. 26, 1999, which are incorporated by reference as if fully set forth.

TECHNICAL FIELD

The invention relates to a method for the performance of measurements for detecting water losses and locating leaks in water supply systems with the use of measurement probes as well as a measurement probe for implementing the method.

PRIOR ART

Losses, in some cases considerable, occur due to pipe ruptures or also due to leaky sections in the area of the water pipes or in the area of the water consumers. Since the pipes of the water supply networks are, as a rule, laid underground, leakage losses can only rarely be detected immediately, and especially if the individual leakage losses are not excessively large. Such leakage losses are, in particular, those quantities of water resulting from the difference between the quantity of water supplied and the quantity of water to be charged to consumers.

A method of locating leaks in interconnected piping networks and a measurement manhole usable therewith has already become known from EP-A 0 009 263. Here, control points are set up at which the flow properties can be detected regularly and simultaneously for the whole piping system simultaneously and over a certain short period of time. A control manhole specially designed for the purpose has to be provided at all the control points, whereby the existing pipes also have to be interrupted as a result, in order to be able to install slide valves, measuring devices and water meters. With such equipment and the method provided here, the first steps may well be able to be taken towards a leakage loss that is to be located within a large area, but a specific search for a leak and a precise fault location is not possible by this means. It must also be regarded as a drawback that the retrofitting of a water supply system with such equipment would probably be a failure on cost grounds alone, not only for the setting up, but also for the day-to-day business.

EP-A-0 009 263 further states in connection with the underlying prior art that it is known, for the purpose of monitoring pipes for leakage losses and for locating leaks in these pipes in crude oil pipelines, to arrange control points in the course of the pipes and to evaluate the flow properties detected there, such as flow rate, flow direction, flow noise, fluid pressure or suchlike in respect of the fluid fed to the pipes and carried away again from them, so that subsequently, in the event of a leak being detected, the pipe run between two such control points can be located by means of targeted measurement and location measures and then be eliminated. Such methods are known, for example, from "Z. 3R International, 15th year (July 1976) vol. 7, p. 375–381", "Z. TÜ 11 (June 1970) no. 6, p. 213215", "Z. Ö1—Zeitschrift fur die Mineralolwirtschaft (1973) p. 2–6". (The corresponding EP-B-0 009 263 gives 1979 instead of 1973 as the year of publication for the latter literature reference). Neither of these literature references shows in itself a method and a measurement probe permitting all the aforementioned flow properties to be determined. On the contrary, each literature reference concerns one or two of the aforementioned flow properties such as, for example, quantity and pressure or direction and pressure or suchlike. Leaks can be detected in this way at great cost in crude oil pipelines, but not in water supply systems where there are countless branches: According to EP-A-0 009 263, this problem is solved by the fact that sub-piping networks are formed. There is a need for a method and a measurement probe with which leaks can be located more reliably in water supply systems, without recourse having to be taken to sub-piping networks.

The problem of the present invention is to provide a method of the type mentioned at the outset and a measurement probe for implementing the method, by means of which an exact analysis in the area of water supply systems including the precise location of a leak is made possible, whereby the measurement probe should be able to be easily installed.

SUMMARY OF THE INVENTION

According to the invention, the problem is solved by a method of the type mentioned at the outset, in which the measurement probes perform at regular or irregular intervals or continuously a measurement of the flow, namely of the flow rate and direction, the water pressure and the flow noise at measurement points, in order to perform an analysis by means of an evaluation device on the basis of a baseline output value for a no-leak or minimal leak condition and, with the data in respect of the water pressure, the flow noise as well as the flow rate and the flow direction, to define the proximity to a leak, whereby the noise detector of each measurement probe is connected individually to a noise correlator in order finally to determine a location of the leak with pinpoint accuracy between two neighboring measurement probes.

By means of the method according to the invention, therefore, all three parameters, namely flow (flow rate and direction), water pressure and flow noise are detected with each measurement probe, in contrast with the methods known from the literature references mentioned above, with which only two of these parameters at most are evaluated, whereby it remains an open question whether the detection of the parameters in fact takes place at the same measurement point.

By means of the method according to the invention, losses of precious, mainly treated drinking water, which in some cases is lost in large quantities in the supply lines, can be reduced to a minimum. The cost outlay incurred on the installation, but also on the performance of the measurements and analyses, remains at a reasonable level. The inquiry can take place cyclically at provided terminals by means of a reader unit. Each measurement probe can also be installed unconnected and be connected direct to a data collector only when required or during routine measurements. The necessary ON-time—chiefly at quiet times of the day and night—will as a rule not exceed thirty to sixty minutes. Repeat measurements carried out at the same time provide, in a comparison of a number of measurements, a very accurate analysis of the water loss and above all the "quasi-zero consumption". Since a number of measurement probes are inserted at suitable intervals from one another, i.e. also in branches, the proximity of the leak can be defined by recording the water pressure and the flow noise as well as the flow direction and flow rate. By means of the integrated noise detectors or sound recorders and a noise correlator adjusted to the latter, a location of the leak can then take place with pinpoint accuracy between two measurement probes.

It is possible, for example, for all the measurement probes to be connected to an evaluation device or a data collector via terminals, radio, modem or cable, whereby the measured elements of the measurement probes of interest at the time can be retrieved and evaluated, whereby analyses of the water loss can be carried out in the assumed areas or also regularly and with the facility to be turned on manually or automatically. There are therefore various options available for retrieving the data directly in a control centre or locally. Particularly in winter times, when manhole covers, slide valve covers etc. are frozen solid, this can be carried out without problem from terminals installed above ground. The only important thing here, of course, is to be able to define precisely the point of the leakage loss between two inserted measurement probes, in order that only a small area has to be dug up so that the leak can finally be repaired.

Very advantageous options also arise with the method according to the invention when many measurement probes are installed. It is then proposed that, in the manner of a random-check generator, various areas of the water pipe network are analyzed alternately and at repeated intervals for water loss and leaks, especially in the case of centrally arranged evaluation systems, for example a data collector or also a noise correlator. This thus enables a constant observation of the water supply network so that leakage losses can thus be prevented or massive leakage losses rapidly detected. By means of a long-term analysis with measurements repeated regularly or also irregularly, it is possible to respond immediately to a significant deviation of the measurement data from a single or from several measurement probes.

The measurement probe for implementing the method is characterized in that measuring elements for the output of measured quantities in respect of the flow, the pressure and the flow noise are integrated into the measurement probe, whereby all these measuring elements can be connected to evaluation devices or a data collector by means of transmission by radio, modem or cable connection.

With such a measurement probe, it has become possible to provide a water supply system with measurement points in a close-meshed manner, whereby leaks can also be detected in a close-meshed manner. Previously it was only possible, by using the most varied systems, to employ one measurement method after the other, whereby a result approaching satisfaction was arrived at with difficulty. As a result of the invention, it has become possible to make all the necessary measuring elements available at all the measurement points, so that, by combining all measurement points and thus also measurement methods, a sought leak can be arrived at quickly and with pinpoint accuracy.

When, according to the invention, it is proposed in an advantageous manner to put the measuring elements in a sleeve-like threaded spindle, whereby this threaded spindle is screwed or can be screwed into a tapped clip, the optimum facility is created for also using the measurement probe at any time subsequently, also in a piping system under pressure. This does not require a special manhole that has to be permanently accessible on account of necessary slide valves etc., but a suitable cable suffices, for example to the earth's surface, where the further connection then follows via terminals, radio, modem or even with a complete interconnection of the measurement probes to one another.

An advantageous measure consists in integrating the three measuring elements into the threaded spindle. It is thus possible to accommodate in the smallest possible space all the necessary measuring elements that are advantageous for an optimum measurement and evaluation. The measuring element for the flow can thereby be an inductive or capacitive measuring element.

Since the piping systems are in full operation, i.e. under full pressure, in the case of the installation facility provided according to the invention, it is advantageous for the external thread of the threaded spindle to be a fine thread or a type of thread which permits installation in water pipes under pressure. By this means, it is readily possible to screw in the measurement probe despite the opposing pressure.

In order to provide a good gripping facility for the insertion of the measurement probe, it is proposed that the measurement probe designed as a threaded spindle should have on one of its ends a tool grip in the manner of a screw head. A tool for transferring the necessary torque can thus be easily applied.

As a result of the embodiment of the measurement probe according to the invention, the latter can be placed directly on a pipe and accordingly remain at any point of the pipe or an installation can also be carried out in an already present manhole. Various options for relaying the data thus arise. It is therefore proposed that a cable outlet for the measuring lead(s) be provided on the measurement probe or a plug arrangement for the connection of one or more evaluation device(s).

Many possibilities that previously were not available arise precisely as a result of the design of the measurement probe according to the invention. It is therefore proposed that such measurement probes be installed at a large number of definable measurement points of a water supply system, especially a drinking water supply network, preferably via tapped clips, and arranged permanently in the latter. Following a one-off installation, either when water pipes are being newly laid or during the retrofitting of existing piping systems, an optimum facility for the constant analysis of the water supply system is then made available.

BRIEF DESCRIPTION OF THE DRAWINGS

Examples of embodiment of the invention will be explained in greater detail in the following description with the aid of the drawings. They show.

DETAILED DESCRIPTION OF THE PREFERRED EMBODIMENTS

Figure 1:
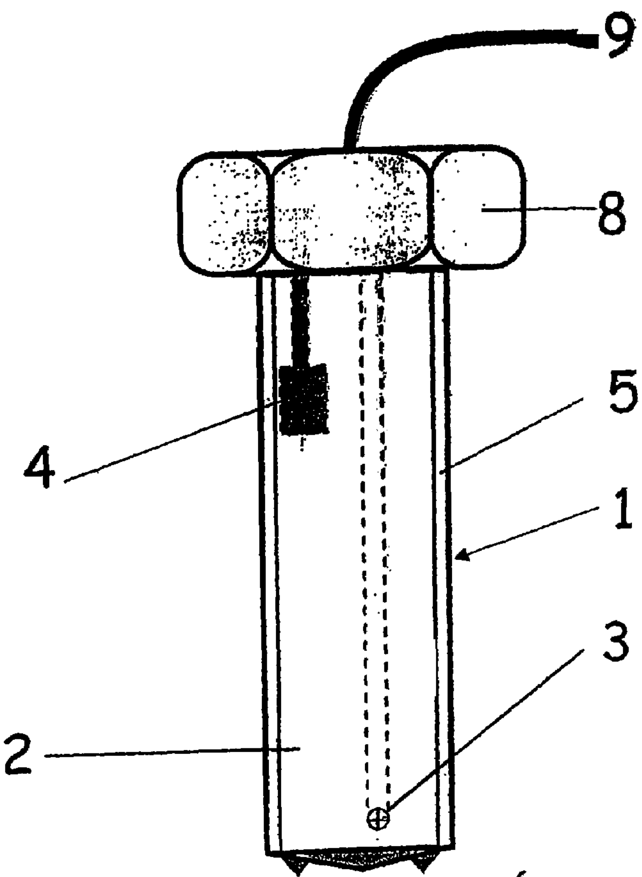
FIG. 1 shows a measurement probe according to the invention represented diagrammatically.
Figure 2:
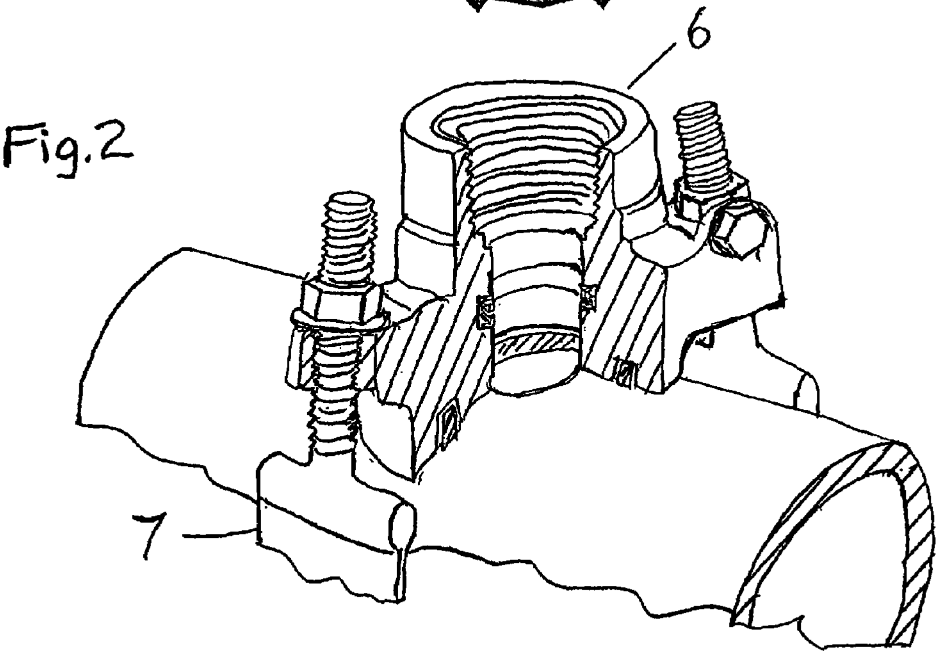
FIG. 2 shows an inclined view of a commercially available tapped clip, into which the measurement probe is inserted, represented partially cut-open.

Measuring elements, i.e. a probe 2 for the flow measurement, a pressure sensor 3 and a noise detector 4, for the output of measured quantities in respect of the flow, namely the flow rate and direction, the water pressure and the flow noise, are integrated into a measurement probe 1 represented in FIG. 1 for water supply networks. These measuring elements are connected or can be connected by means of transmission via a terminal, by radio, modem or cable connection to an evaluation device or a data collector 12 or, in respect of the noise detector, to a correlator. The essential thing, therefore, is that there are integrated in one measurement probe all the measuring elements that are required for optimum leak location and thus for optimum monitoring and analysis of a water supply network. Measurement probes capable of supplying all the necessary measured values are thus available at all the measurement points.

The measuring elements are placed in a sleeve-like threaded spindle 5, whereby this threaded spindle 5 is screwed or can be screwed into a tapped clip 6. Simple installation of measurement probe 1 is thus possible even after many years, if a water supply system is to be accordingly equipped. In this way, it is also possible to complete a water supply system accordingly with measurement probes step by step, since an installation with tapped clips can be carried out at any time and at any points.

It is advantageous for probe 2 for the flow measurement to be designed as an inductive flow meter. Pressure sensor 3 and noise detector 4 can be designed as modules known per se, which however must be able to be integrated into the threaded spindle. The precise design of the integrated measuring elements does not matter. It can be measuring elements of the most varied manufacture and the most varied mode of operation, but they must be able to deliver, in concert with one another, the values required for the necessary analyses.

Threaded spindle 5 is of course provided with an external thread, whereby this external thread is advantageously a fine thread. Another kind of thread could however also be provided, which enables an installation of measurement probe 1 in a pipe under pressure. For the handling of measurement probe 1 designed as a threaded spindle 5, the latter has a tool grip 8 in the manner of a screw head on one of its ends. Within the scope of the invention, any other variant of a tool grip may of course also be provided. If an especially slim design of a measurement probe is required, an internal tool grip at one of the ends of the measurement probe would also be conceivable, whereby cables or measuring leads 9 could then also be led out at the side.

An outlet for measuring lead(s) 9 is provided on measurement probe 1. This cable can be taken for example to an above-ground terminal. This would also enable permanent access to the measurement data on the spot, without the manhole cover etc. first having to be raised. It is however also possible to provide, on measurement probe 1 itself or even in an easily accessible terminal, a plug arrangement for the connection of one or more evaluation devices or data collectors 12.

Figure 3:
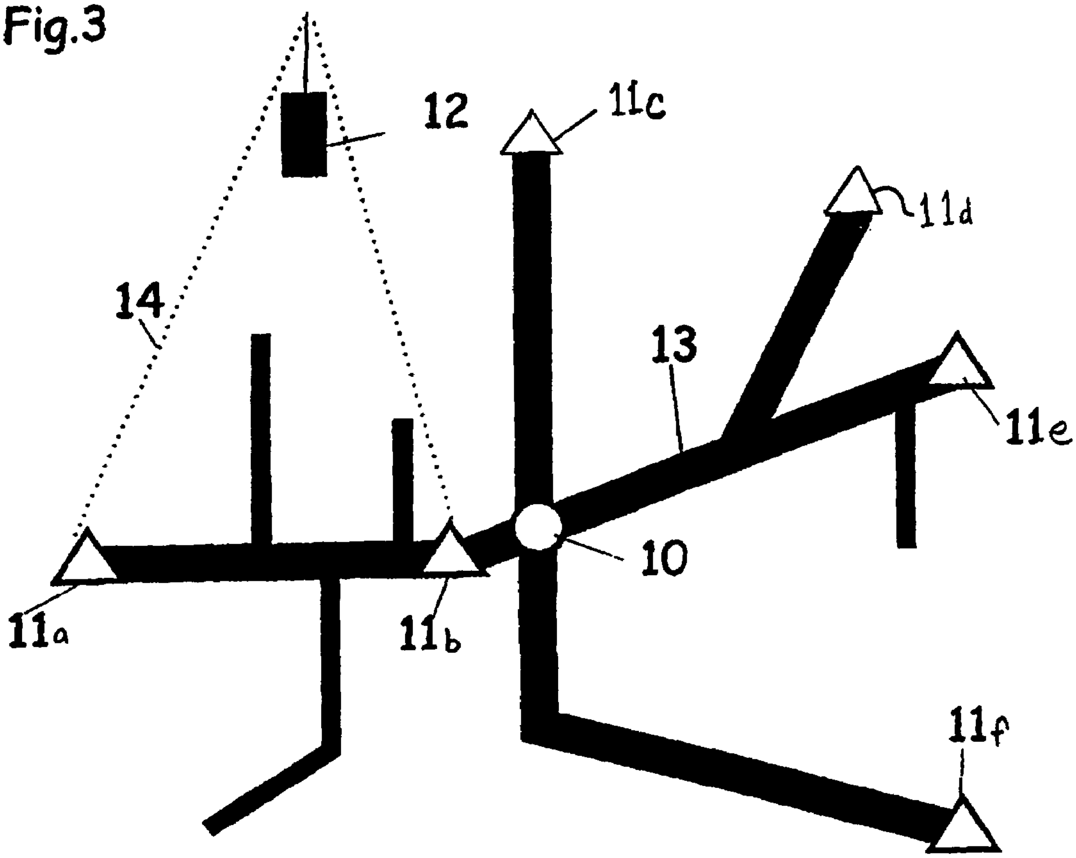
FIG. 3 shows a pipe section in a water supply system represented diagrammatically.

As can be seen from FIG. 3, measurement probes 1 with all the integrated measuring elements are installed at key points 10 and at a large number of definable measurement points 11 of a water supply network 13, especially a drinking water supply network. If they are not already fitted when a water supply network is newly installed, these measurement probes 1 can also be provided subsequently by the installation of tapped clips 6. Measurement probes 1 thus form a fixed component for constant use in water supply network 13 and are arranged permanently in the latter. Measurement probes 1 are connected or can be connected when needed to an evaluation system or one or more data collectors 12 via measuring leads 14 or via radio or via a modem.

For the performance of comparison measurements to determine water losses and to locate leaks in water supply systems using measurement probes 1, a measurement of the flow (flow rate and direction) and the pressure at regular or irregular intervals or continuously, with noise detector 4 connected part of the time or constantly if necessary, with the aid of measurement probes 1 installed permanently at key points 10 and/or measurement points 11 and an analysis by means of an evaluation system or a data collector 12 are performed, whereby a noise correlator 12 amongst other things is also provided. A baseline output value based on a no-leak or minimal leak condition can thus be recorded. The data relating to the water pressure and the flow noise as well as the flow rate and the flow direction define the proximity to a leak. Noise detector 4 in each measurement probe 1 can be connected individually to a noise correlator, in order that the location of a leak can finally be carried out with pinpoint accuracy between two neighboring measurement probes 1 and thus between neighboring key points 10 and/or measurement points 11. A suitably small interval between the measurement probes provided with noise detectors 4 is however required for this. The possibility of performing a noise correlation is dependent on the type of piping of the water supply system. In the case of plastic piping, the measurement probes must be present at smaller intervals than in the case of piping made of cast iron pipes.

All measurement probes 1 are connected to the evaluation device or data collector 12 via terminals, radio, modem or a cable, whereby the measured elements of measurement probes 1 of interest at the time are retrieved and evaluated. Analyses of the water loss can thus be carried out in the assumed areas or also regularly and with the facility to be turned on manually or automatically.

Precisely as a result of the special design of measurement probes 1 and the measurement and evaluation method in respect of the acquired data, still further options are open for constantly monitoring the precious commodity drinking water. It would thus be possible, in the manner of a random-check generator, to analyze different areas of water supply network 13 for water loss and leaks alternately and at repeated intervals with a centrally arranged evaluation device or data collector 12.

Measurement probe 1 according to the invention and the method can be used to advantage in communal drinking water supply systems, since water losses, in some cases quite considerable, occur there repeatedly due to leaks or to leaky valves in the supply units themselves (dwelling houses, offices, but also trade and industry etc.). These leaks and, therefore, water losses areas a rule only detected when water damage becomes visible. A flow meter, possibly even installed in various places, e.g. a main branch point, at the house connections etc., is alone not sufficient for a measurement here.

A loss measuring unit is proposed here, which is used in an arrangement of several up to a multiple arrangement in a water supply system and also remains in use there. It is then possible to ascertain in relatively small pipe sections whether a water flow or a flow rate—also in a certain flow direction—or certain noises or a pressure change in the piping that is more than usual at certain times of the day or night points to a possible water loss. It is thus possible to create a close-meshed control facility for each water works. The more measurement probes arranged in a water supply system, the more precisely can constant monitoring take place.

There are therefore fixed measurement points arranged in a multiple arrangement on the main feed lines, on the ring mains and also on the lines in the dense interconnected area. When lines are being newly laid, corresponding connection lines can also be put in with them. In any event, the measurement points always remain available at the place of use. Remote inquiries or a connection, for example, by modems to a central control station are also possible, so that, if the need arises, only one evaluation station or one data collector 12 is needed to evaluate the data of the measurement results. It is therefore also possible, e.g. during the night hours, to carry out repeated checks in very special areas in order to establish whether there is a change in the otherwise normal flow quantity. The ideal arrangement is of course if all the measurement points can be consulted arbitrarily combined with one another for measurements from a central control station.

Each measurement probe 1 can be installed extremely easily in the piping system by means of tapped clips. Since such a piping system has the most varied pipe dimensions, mounted clips are provided which are fitted under pressure or in the unpressurized state, in cooperation with a corresponding drilling tool. Measurement probe 1 can also be screwed in by means of various adapters adapted to the different tapped clips. After installation of measurement probe 1, direct access to the drinking water is no longer possible, so that there is no risk of an intentional or even unintentional contamination of drinking water.

With the measurement probe proposed here and the proposed method, it is essentially a matter of having a constant control through the arrangement of a large number of measurement probes, which is not restricted solely to the main lines, but above all extends into the dense network—which is chiefly where a particular loss of water occurs. In this connection, the need of course arises for specially designed measurement probes, which must be mounted fixed on the lines and should be set up in a simple and cost-effective manner, in order that such a large number of measurement points can in fact be created cost-effectively. However, when drinking water, in particular, is becoming more precious and when leaks and faulty valves therefore have to be found quickly—before water emerges somewhere at the surface, then substantial investments should also be made in such a sector.

An example using the system shown in FIG. 3 for locating a leak according to the invention requires that the data collector/correlator 12 initially measure baseline values of flow rate and direction, pressure and noise at each of the measurement points 11*a*, 11*b*, 11*c*, 11*d*, 11*e*, 11*f* where the measurement probes are installed. These baseline values can be established through periodic measurement at regular intervals throughout a day or week, or can be the result of continuous monitoring. The established baseline values $Flow_0$, $Pressure_0$ and $Noise_0$ for each of the measurement points are then stored in the data collector/correlator 12. Maximum tolerance values are entered into or set in the data collector/correlator 12. These can be set with positive and negative tolerance boundaries.

Periodic or continuous measurements of flow rate and direction, pressure and noise are then taken at each of the measurement points using the measurement probes 1. If at least one of the maximum tolerance values is exceeded, an alarm notification is issued by the collector/correlator 12. The alarm notification can also be set by the system to only issue if two or more parameters exceed the maximum tolerance values, and or can be set only to issue if the collector/correlator 12 indicates a continuing perturbation from the established baseline values and tolerances. A continuing perturbation can be, for example, at least one of the maximum tolerance values being exceeded for two or more periodic measurements or for a predetermined time period, such as a 12 hour period.

The perturbation values from adjacent measurement points 11*a*, 11*b*, 11*c*, 11*d*, 11*e*, 11*f* can then be analyzed to pinpoint a leak location. This can be done by analyzing flow rate and direction, pressure and noise perturbations that fall within the maximum tolerance values of these adjacent measurement points to determine a specific branch of a system that has a leak. For example, if measurement point 11*b* shows at least one of a flow rate and direction, pressure or noise level that triggers the alarm notification, then the data collector/correlator 12 can examine the data for measurement points 11*a*, 11*c*, 1*d*, 11*e* and 11*f* to determine the branch with the next highest perturbations in flow rate, pressure and noise, even if it does not exceed the maximum tolerance values for that probes baseline of $Flow_0$, $Pressure_0$ and $Noise_0$. A leak located between measurement point 11*b* and 11*c* could thus be identified using all of the measured values.

The location of the leak can then be pinpointed by the data collector/correlator 12 using the pressure loss or fluctuation in connection with a noise analysis and flow rate of the water within the pipe to calculate a location of the leak. This is preferably carried out by analyzing the noise propagation through the water in the pipes based on the speed of sound of the noise through the water, with correction for flow rate and direction through the piping system. For example, once a pressure drop below a threshold value is detected, a noise perturbation is tracked by measurement points 11*b* and 11*c*, and compared. Based on the speed of sound through water of about 4800 feet per second, the approximate position of the leakage source can be calculated based on the time differential of the noise perturbation being received at the measurement points 11*b*, 11*c*. This is preferably corrected using the flow rate and direction, for example 80 feet per second, of the water through the pipe, which in FIG. 3 is in a direction from measurement point 11*b* toward 11*c*, which would result in the speed of sound from measurement point 11*c* toward the leak being reduced to 4720 feet per second and the speed of sound from measurement point 11*b* toward the leak being increased to 4880 feet per second.

Using the invention therefore allows the precise position of the leak to be located using the flow rate, pressure and noise data measured by the measurement points 11*a*–11*f* and transmitted the collector/correlator 12.

What is claimed is:

1. A method to detect water losses and to locate leaks in a water supply system (13), comprising the steps of locating measurement probes (1) at predetermined measurement points (11) in said system, the measurement probes including measuring elements for outputting measured quantities indicative of a flow rate and direction, a pressure and noise integrated into each measurement probe (1), deriving from said probes (1) at intervals or continually measurements of flow data including flow rate and direction, water pressure and noise, analyzing said flow rate and direction, water pressure and noise data using an evaluation unit to determine a presence of and a proximity of a leak, and simultaneously connecting said probes to a noise correlator to determine a location of a leak between two neighboring probes, wherein in the manner of a random-check generator, different areas of said water supply system (13) are analyzed for water loss and leaks alternately and at repeated intervals.

2. The measurement probe for performing the method according to claim 1, characterized in that all said measuring elements are adapted to be connected to evaluation devices or a data collector (12) by means of transmission by radio, modem or cable connection.

3. The measurement probe according to claim 2, characterized in that said measuring elements are inserted in a sleeve-like spindle (5), said spindle (5) being screwed or being adapted to be screwed into a tapped clip (6).

4. The measurement probe according to claim 3, characterized in that all three of the measuring elements are integrated into the same spindle (5).

5. The measurement probe according to claim 3, characterized in that the external thread of the threaded spindle (5) is a type of thread that permits the installation of the measurement probe in water pipes under pressure.

6. The measurement probe according to claim 3, characterized in that the measurement probe (1) designed as a threaded spindle (5) has a tool grip (8) in the manner of a screw head on one of its ends.

7. The measurement probe according to claim 2, characterized in that the measuring element for the flow is an inductive measuring element (2).

8. The measurement probe according to claim 2, characterized in that the measuring element for the flow is a capacitive measuring element.

9. The measurement probe according to claim 2, characterized in that a cable outlet for measurement leads (9) is provided on the measurement probe (1) or a plug arrangement for the connection of one or more evaluation devices.

10. The measurement probe according to claim 2, characterized in that said measurement probes (1) are installed at the predetermined measurement points (11) of said water supply system (13) via said tapped clips (6) in said system while it is under pressure.

* * * * *